United States Patent [19]

Berry

[11] Patent Number: 5,492,355
[45] Date of Patent: Feb. 20, 1996

[54] WHEELCHAIR BRAKE

[76] Inventor: Theodore M. Berry, 3813 Coventryville Rd., Coventryville, Pa. 19465

[21] Appl. No.: 186,278

[22] Filed: Jan. 24, 1994

Related U.S. Application Data

[63] Continuation-in-part of Ser. No. 860,858, Mar. 31, 1992, Pat. No. 5,280,938.

[51] Int. Cl.$^6$ .................................................. B60T 1/04
[52] U.S. Cl. .......................... 280/304.1; 74/526; 74/529; 188/2 F
[58] Field of Search ............................ 280/304.1, 250.1; 74/489, 502.2, 526, 529; 188/2 D, 2 F, 24.12, 24.16, 24.19

[56] References Cited

U.S. PATENT DOCUMENTS

| | | | |
|---|---|---|---|
| 2,426,451 | 8/1947 | Hammack | 188/2 |
| 3,529,700 | 9/1970 | Marshall | 188/109 |
| 3,679,257 | 7/1972 | Jacuzzi et al. | 297/42 |
| 3,941,215 | 3/1976 | Schoch | 188/24 |
| 4,204,588 | 5/1980 | Kawecki | 188/2 F |
| 4,350,227 | 9/1982 | Knoche | 188/2 F |
| 4,384,732 | 5/1983 | Wierwille | 280/289 WC |
| 4,489,955 | 12/1984 | Hamilton | 280/242 WC |
| 4,511,158 | 4/1985 | Varga et al. | 280/304.1 |
| 4,537,415 | 8/1985 | Delahoussaye et al. | 280/242 WC |
| 4,538,826 | 9/1985 | Lemarie | 280/242 WC |
| 4,560,033 | 12/1985 | DeWoody et al. | 188/2 F |
| 4,560,181 | 12/1985 | Herron | 280/242 WC |
| 4,570,756 | 2/1986 | Minnebraker et al. | 188/2 F |
| 4,762,332 | 8/1988 | Seol | 280/242 WC |
| 4,852,697 | 8/1989 | Kulik | 188/2 F |
| 4,887,830 | 12/1989 | Fought et al. | 280/304.1 |
| 4,916,967 | 4/1990 | Nakamura | 74/502.2 |
| 4,977,792 | 12/1990 | Nagano | 74/502.2 |
| 5,076,390 | 12/1991 | Haskins | 280/250.1 |
| 5,174,418 | 12/1992 | Le et al. | 280/250.1 X |

FOREIGN PATENT DOCUMENTS 1141954  3/1957  France.

Primary Examiner—Karin L. Tyson
Assistant Examiner—Victor E. Johnson
Attorney, Agent, or Firm—Dann, Dorfman, Herrell and Skillman; Henry H. Skillman

[57] ABSTRACT

Braking apparatus for use on wheelchairs are provided by the present invention. The braking apparatus may be used on a wheelchair having a pair of rotatable wheels and a frame member. The apparatus includes a mounting assembly connected to the frame member wherein the mounting assembly comprises first and second clamp sections for securing the mounting assembly to the frame member; a quick release assembly for compressing the first and second clamp sections around the frame member; and frictional braking means for slowing the rotation of at least one of said wheels.

28 Claims, 10 Drawing Sheets

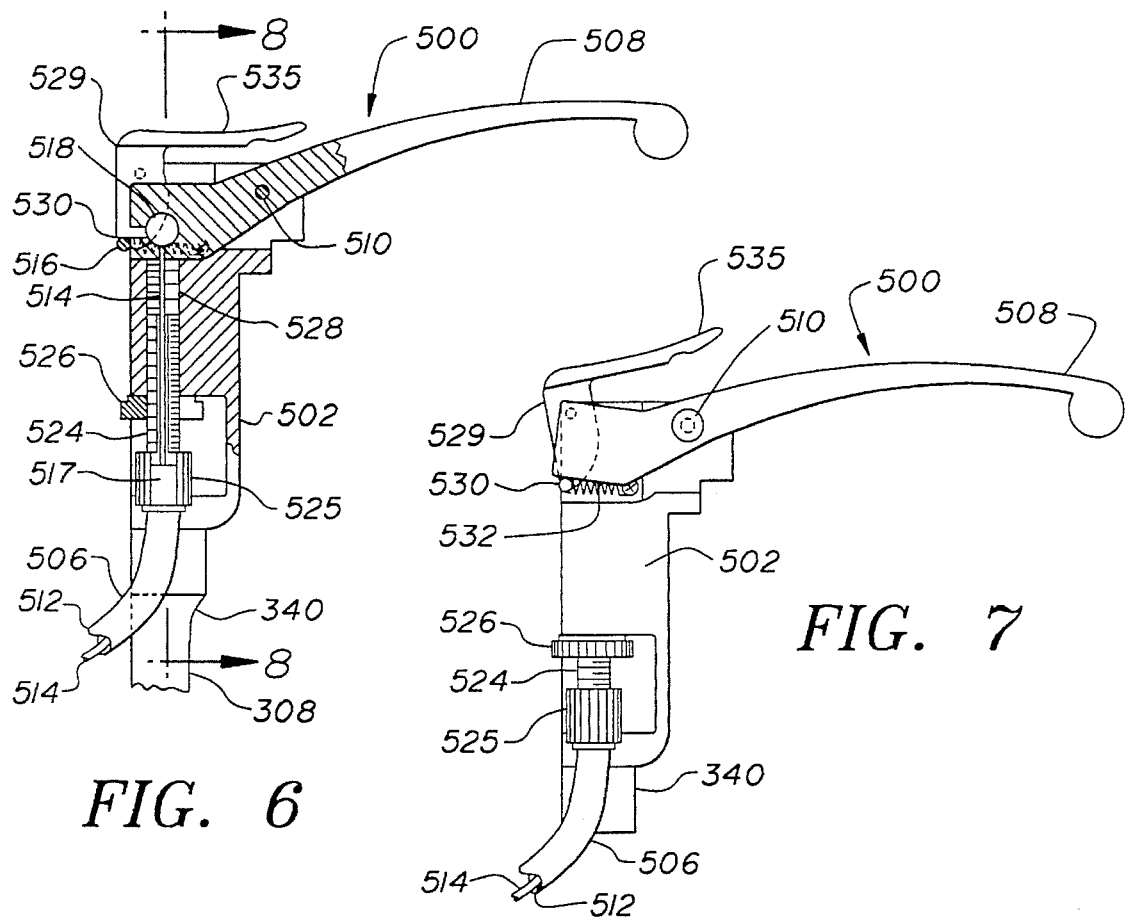
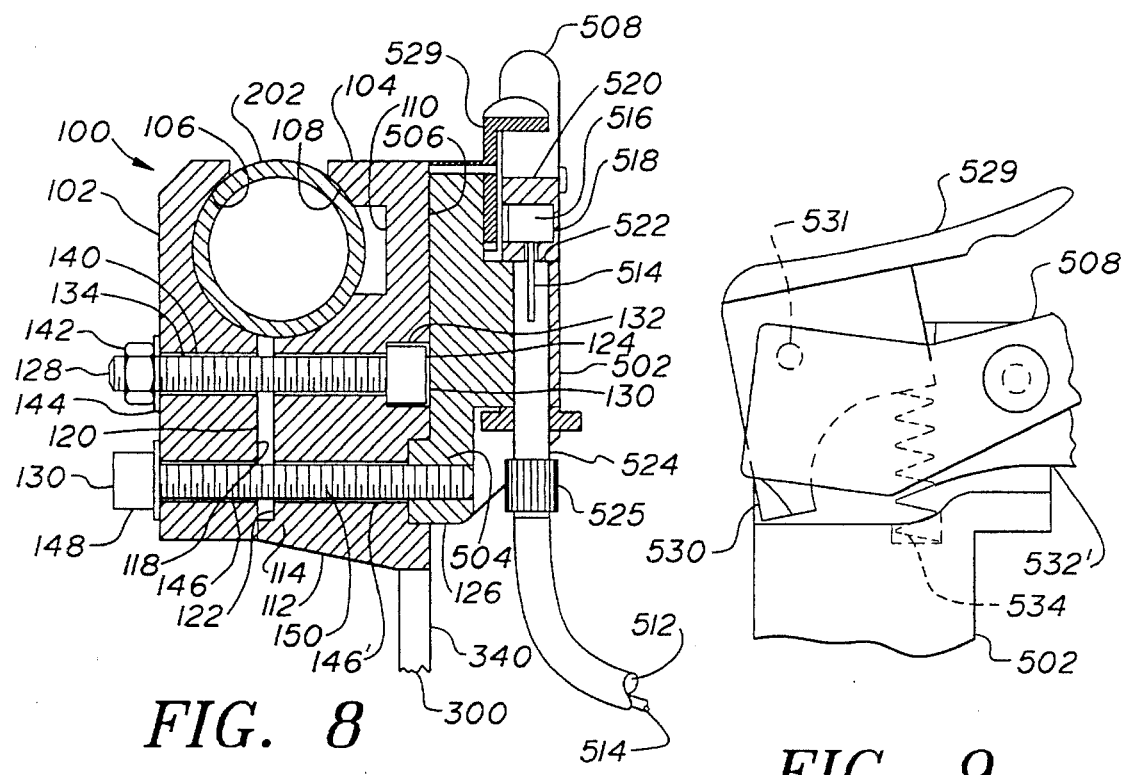

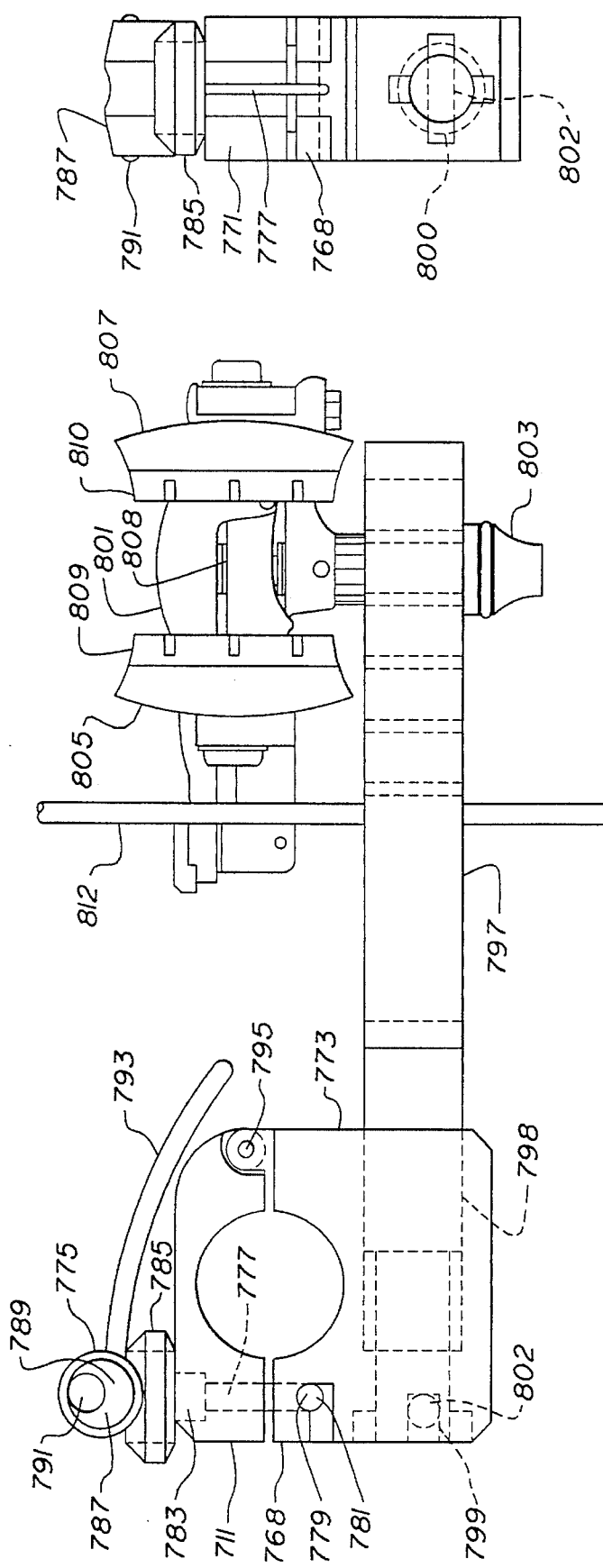

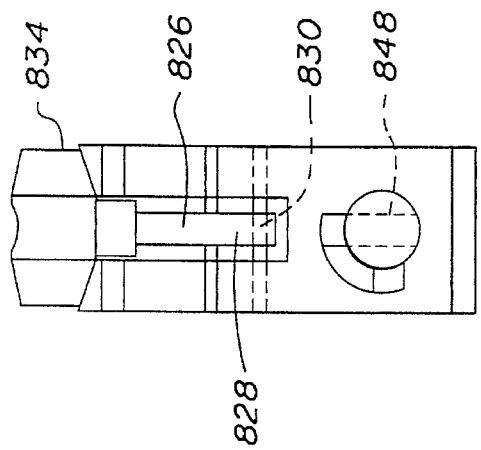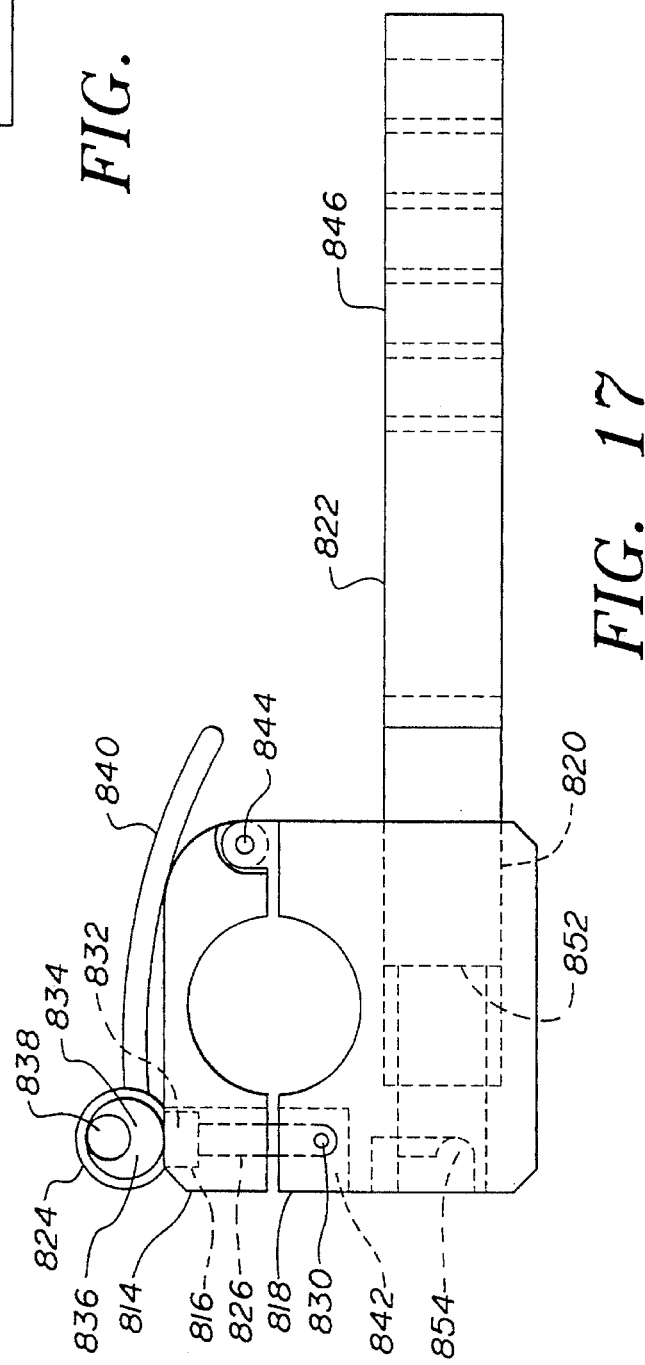

WHEELCHAIR BRAKE

CROSS-REFERENCE TO RELATED APPLICATIONS

This application is a continuation-in-part application of commonly-owned U.S. Ser. No. 07/860,858, filed on Mar. 31, 1992, now U.S. Pat. No. 5,280,938.

FIELD OF THE INVENTION

This invention relates generally to the field of wheelchairs and more particularly to brakes or brake locking devices for wheelchairs which can be mounted on a wheelchair and adjusted without the use of tools.

BACKGROUND OF THE INVENTION

Numerous devices for braking and preventing wheelchairs of various types of construction from moving are known, and many of these devices are the subject of United States patents. The patents to Herron, U.S. Pat. No. 4,560,181, and Lemarie, U.S. Pat. No. 4,538,826, relate to or disclose wheelchair braking devices wherein caliper-type brake attachments are provided which urge against the wheelchair wheel rim in order to control the movement of the wheel. In the Herron patent, the brake mechanism includes a handbrake mounted on a lever arm which is coupled through a brake cable to a brake assembly. There appears to be no specific description of how the brake assembly is mounted to the frame. The patent to Lemarie includes a type of propelling mechanism whereby a caliper-type arrangement, including engagement pads, contacts the rim of the wheelchair wheel in order to aid in propelling the wheel.

Additional patents to DeWoody et al. and Fought et al., U.S. Pat. Nos. 4,560,033 and 4,887,830, respectively, disclose more conventional types of braking apparatus for wheelchairs. In each of these patents, the braking mechanisms includes a braking member which urges directly against the tire, rather than the rim, to prevent movement.

Wheelchair brakes are also disclosed in the patents to Marshall, U.S. Pat. No. 3,529,700; Hammack, U.S. Pat. No. 2,426,451; Wierwille, U.S. Pat. No. 4,384,732; Minnebraker et al., U.S. Pat. No. 4,570,756; Kulik, U.S. Pat. No. 4,852,697; and Knoche, U.S. Pat. No. 4,350,227. All of these patents disclose braking devices for wheelchairs wherein braking pressure is applied directly to the tire rather than to the wheel rim.

Of particular interest is the patent to Kawecki, U.S. Pat. No. 4,204,588, wherein a wheelchair braking apparatus which incorporates a caliper brake as the braking member is disclosed. That Kawecki invention includes a braking device which locks the primary wheels so that when an individual gets out of the wheelchair the braking mechanism can be actuated to prevent the chair from rolling backward. The specific wheelchair disclosed in the Kawecki patent includes a pair of crossbraces to which are attached a bracket consisting of an upright portion and a horizontal portion. The vertical or upright portion spans the distance between the crossbraces and is provided with holes at each end so that U-bolts can pass therethrough to attach the bracket to the brace members. The horizontal portion is preferably welded to the upright portion and extends outwardly therefrom beyond the primary wheels and parallel to the axis which mounts the primary wheels onto the wheelchair. A vertical pivot point is provided on the horizontal portion of the bracket directly in line with and proximate to the primary wheel. A conventional two-arm caliper brake having a pair of brake pads is affixed to the pivot point. The brake pads are connected to a control wire. When the wire is pulled, the brake pads come into contact with the rim of the wheel. The wire is controlled by what is termed a remotely located actuating device which includes a pivotal lever arm connected at one end to the wire. Forcing the pivot arm downwardly causes the wire to pull and ultimately urges the brake pads against the wheel rim.

During recent years with the advent of lighter and stronger tubular materials, wheelchairs have undergone important technological improvements. No longer is it necessary for wheelchairs to literally resemble "chairs on wheels" with rigid vertical frames and vertical wheels with armrests and handles for pushing. Wheelchairs today are lighter, more maneuverable and reflect the increased desire of many wheelchair-bound persons to be able to get about as independently as possible.

While the wheelchair frame and materials have undergone an important evolution, little has been done to improve the ability of the wheelchair user to stop the motion of the wheelchair and maintain a fixed position.

One of the most used devices for stopping and securing the wheelchair is a brake device similar to that shown in the Minnebraker et al. patent, U.S. Pat. No. 4,570,756, where a lever arm is provided which urges a braking member into contact with the tread of the wheelchair tire. While a popular device, this brake causes unnecessary wear to the tire tread, it is not totally effective in holding the wheelchair on sloped surfaces and becomes almost unusable when the tire is wet. The device is only applied to one wheel, so if stopping action is desired on both wheels of the wheelchair, two devices must be applied and engaged by using two hands, which sometimes simply is not possible.

Furthermore, many of the former types of braking devices were developed for use with wheelchairs with armrests and are designed to be attached to the armrests. Many of the newer, lightweight model wheelchairs do not even have arms.

In this regard, it would be beneficial if a wheelchair brake were available which will overcome these and other deficiencies in the prior art types of wheelchair braking devices.

OBJECTS OF THE INVENTION

Accordingly, it is the general object of this invention to provide an apparatus which increases the ability of the user of a wheelchair to easily and safely control the motion of the wheelchair and to provide an apparatus which is easily mounted and removed from a wheelchair.

It is an object of the invention to provide a wheelchair brake which controls the movement of the wheelchair wheels by clamping the rim of the wheels between a caliper-type clamp, rather than applying pressure to the tire tread.

It is an additional object of the invention to provide a wheelchair brake which can be easily and effectively attached to any shape of wheelchair frame in front of the wheel to be braked without having to be attached to an armrest of the wheelchair.

It is another object of the invention to provide a wheelchair brake which stops the motion of the main wheels of the wheelchair at the same time with the application of pressure to a single brake actuating mechanism.

It is a further object of the invention to provide a wheelchair brake which is actuated by applying a downward and forward force to the brake actuating mechanism.

It is yet another object of the invention to provide a wheelchair brake which may be installed, removed or adjusted without the use of tools.

It is yet another object of the invention to provide a wheelchair brake which allows one to remove a wheelchair's main wheel(s) without interference from the brake when mounted on the wheelchair.

It is yet another object of the invention to provide a wheelchair brake which allows the user to mount the brake actuating mechanism separately from the braking mechanism which engages the wheel.

It is yet another object of the invention to provide a wheelchair brake wherein the braking mechanism can be locked into position to prevent movement of the wheelchair wheels even after pressure is removed from the brake actuating mechanism.

It is an object of the invention to provide a wheelchair brake wherein the brake mechanism can be adjustably angled to conform to the camber of the wheelchair wheels.

It is also an object of the present invention to provide a compact brake actuating mechanism which can be easily adjusted to vary the amount of pressure necessary to effect the braking of the wheelchair wheels.

SUMMARY OF THE INVENTION

These and other objects of the instant invention are achieved by providing an improved apparatus for braking and holding fast the wheels of a wheelchair. The improved braking device is mounted onto the siderail of the wheelchair forward of at least one primary wheel of the chair.

This invention provides a brake apparatus for use on a wheelchair having a pair of rotatable wheels and a frame member wherein the apparatus comprises a mounting assembly comprising first and second clamp sections for securing the mounting assembly to the frame member; a quick release assembly for compressing the first and second clamp sections around the frame member; and frictional braking means for slowing a rotation of at least one of said wheels.

The present embodiment of the braking device has been improved by modifications which eliminate the need for tools when installing, removing or adjusting the braking device. In particular, the mounting assembly for the braking device may be easily mounted or removed from a wheelchair frame without tools by virtue of a quick release assembly which allows the user to quickly mount and demount the wheelchair brake from a wheelchair.

Although applicants prefer the use of caliper brakes as are known in the art, it is believed that a variety of other braking apparatus may be used in the present invention. In general, these type of apparatus may be considered as frictional devices and include any braking device which slow and/or stop the movement of the wheelchair wheel by applying a friction to the wheel itself or any part of the wheel associated with the rotation of the wheel.

The brake assembly alternatively includes a caliper brake positioned to clamp the rim of the wheel and which is axially aligned with the axis of rotation of the wheel. A pivotable brake lever is connected to a mounting assembly clamped onto the siderail and a connecting structure connects the mounting assembly to the caliper brake. The connecting structure extends vertically downward from the mounting assembly and horizontally at the bottom end thereof parallel to the axis of rotation of the wheel which may be angled to accommodate a camber in the wheel. The caliper brake is mounted on the connecting structure. A cable connects the brake lever and the caliper brake in such a manner that rotating the lever causes the brake to clamp against the wheel rim and prevent rotation thereof. A locking apparatus is positioned adjacent the lever arm to automatically retain the lever arm in the brake actuating position until the locking apparatus is released. The invention also includes an embodiment wherein caliper brakes are mounted adjacent each wheel of the chair. Each brake may be independently operated or a second cable may interconnect the two caliper brakes such that actuation of the first caliper brake also causes the second brake to actuate at the same time. The brake lever is positioned such that a forward and downward motion cause the lever to pivot and initiate the brake clamping.

BRIEF DESCRIPTION OF THE DRAWINGS

The accompanying drawings illustrate the preferred embodiments of the drawings.

FIG. 6 is a fragmented side elevational view partially cut away of the brake actuating and locking mechanism of the present invention;

FIG. 7 is a side elevational view of the brake actuating and locking mechanism of the present invention;

FIG. 8 is a cross-sectional view taken along the line 8—8 in FIG. 6;

FIG. 9 is a fragmented side elevational view of a second embodiment of the brake actuating and locking mechanism of the present invention.

FIG. 15 is a front view of the caliper brake and caliper brake mounting assembly of a preferred two-part embodiment of the present invention.

FIG. 16 is a side view of the caliper brake mounting assembly of FIG. 15 (without caliper brake attached).

FIG. 17 is a front view of a preferred embodiment of a caliper brake mounting assembly of the present invention incorporating a rotating caliper mount.

FIG. 18 is a side view of the caliper brake mounting assembly of FIG. 17.

DETAILED DESCRIPTION OF THE INVENTION

Figure 1:
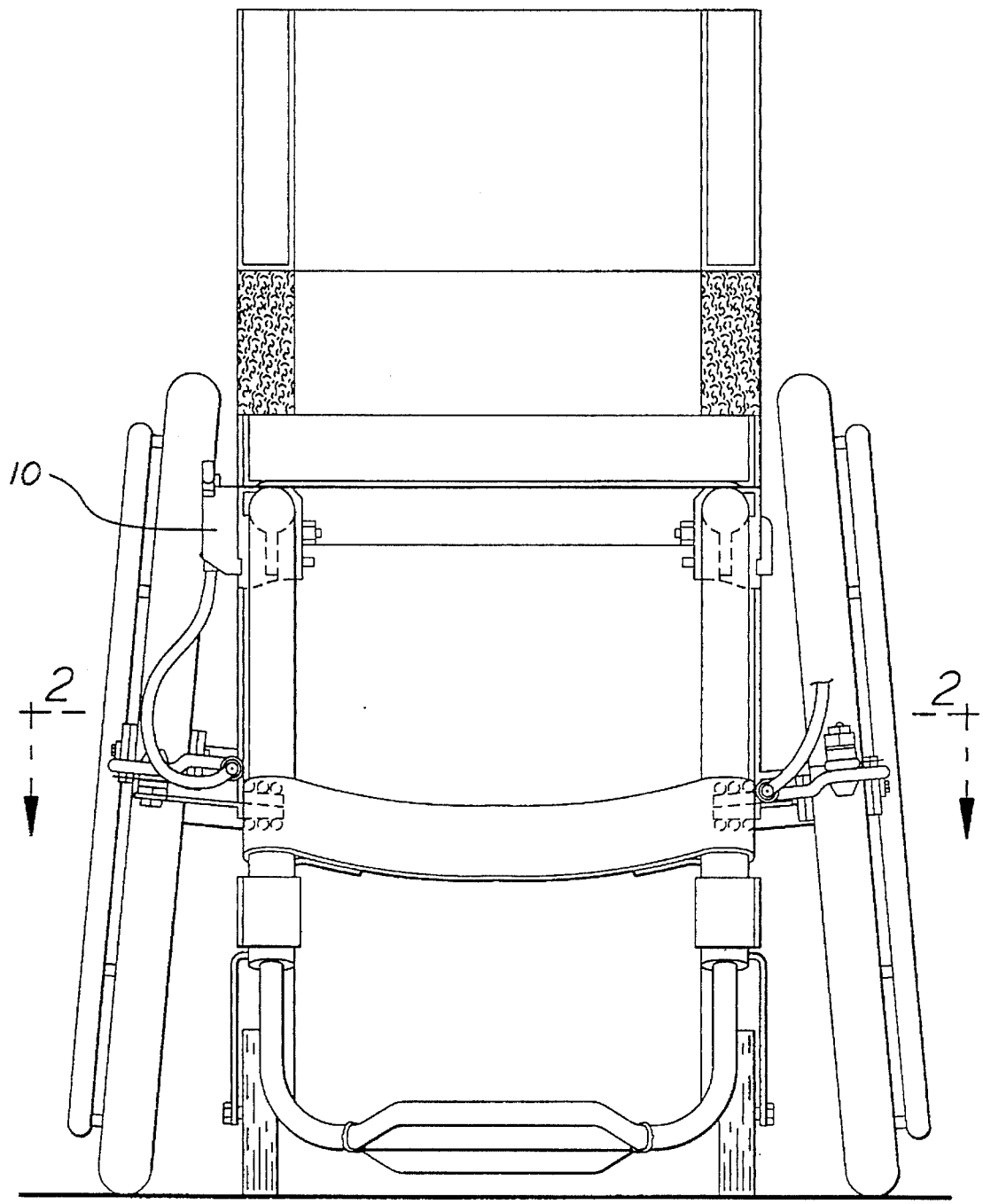
FIG. 1 is a front elevational view of a wheelchair with the braking device of the present invention mounted thereon.

Referring in greater detail to the various figures of the drawings wherein like reference characters refer to like parts, a wheelchair braking apparatus of the present invention is generally shown at 10 in FIG. 1 connected to a wheelchair 200.

The braking apparatus 10 includes a mounting assembly 100 connected to one of the siderails 202 of the frame of the wheelchair 200. A connecting assembly 300 at the bottom of the mounting assembly 100 interconnects a brake assembly 400 surrounding the rim 204 of one of the main wheels 206 of the wheelchair to the mounting assembly 100. An actuating assembly 500 is connected to the mounting assembly 100. The actuating assembly 500 is further connected to the braking assembly 400 and operates to actuate the braking assembly and cause it to clamp against and grip the rim 204 of the main wheel 206 of the wheelchair 200. Clamping of the brake assembly 400 against the rim 204 prevents the wheel 206 from rotating.

As further shown in FIG. 1, a second braking apparatus 12 is mounted onto a second siderail 208 opposite the first siderail 202. The second braking apparatus 12 includes a second mounting assembly 100' connecting the apparatus 12 to the siderail 208 in the same manner as the first mounting assembly 100. Furthermore, a second connecting assembly 300' connects the mounting assembly 100' to a second brake assembly 400' in the same manner the first connecting assembly 300 connects the first mounting assembly 100 and the first braking assembly 400. In the embodiment shown in FIG. 1, rather than have a second actuating assembly similar to the first actuating assembly 500, which would be acceptable under some circumstances, the second brake assembly 400' is connected to the first brake assembly 400 by a cable 900 which causes the second brake assembly 400' to clamp the rim 210 of the second main wheel 212 of the wheelchair 200 at the same time the actuating assembly 500 causes the first brake assembly 400 to clamp the rim 204 of the first main wheel 206.

It can still further be seen in FIG. 1 that the invention is adapted to be used with a wheelchair 200 of the type that does not have armrests or arm supports and which has primary wheels 206, 212 axially mounted onto the frame of the wheelchair at an angle or camber, thereby causing the wheels to angle outward from vertical. Such wheelchair construction is known in the art and provides a lighter and more maneuverable wheelchair than older conventional model wheelchairs, especially those with vertical primary wheels and armrests. The invention, of course, can be easily used with vertical primary wheels as well.

The present invention envisions the use of either one or both of the braking apparatuses 10, 12, which have substantially identical construction, except for certain allowable modifications which will be discussed. Because of the similarity, discussion will primarily be made with respect to only the first braking apparatus 10.

Figure 2:
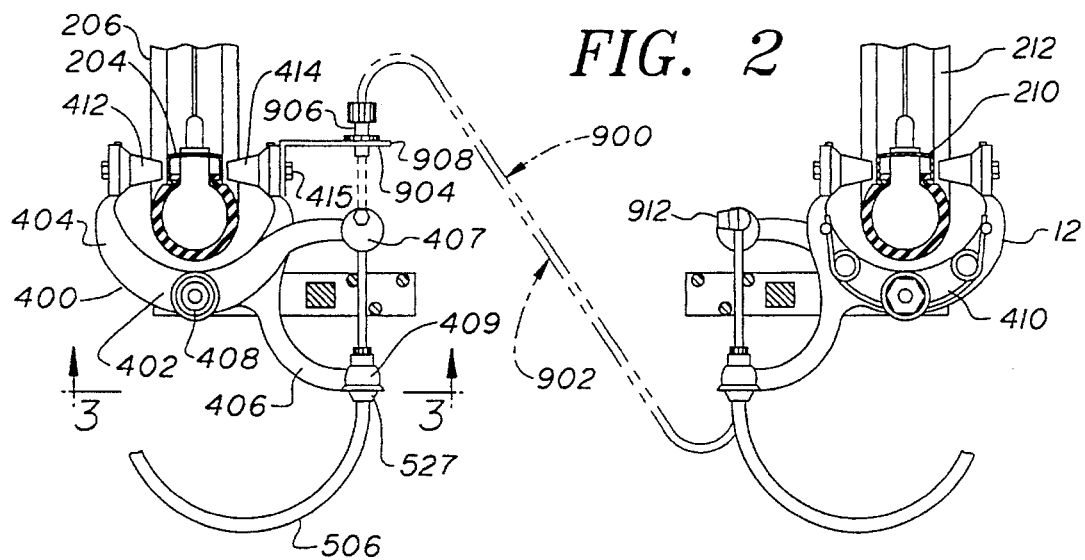
FIG. 2 is an enlarged cross-sectional view taken along the line 2—2 in FIG. 1 showing the interconnection between the braking mechanisms of the present invention.
Figure 3:
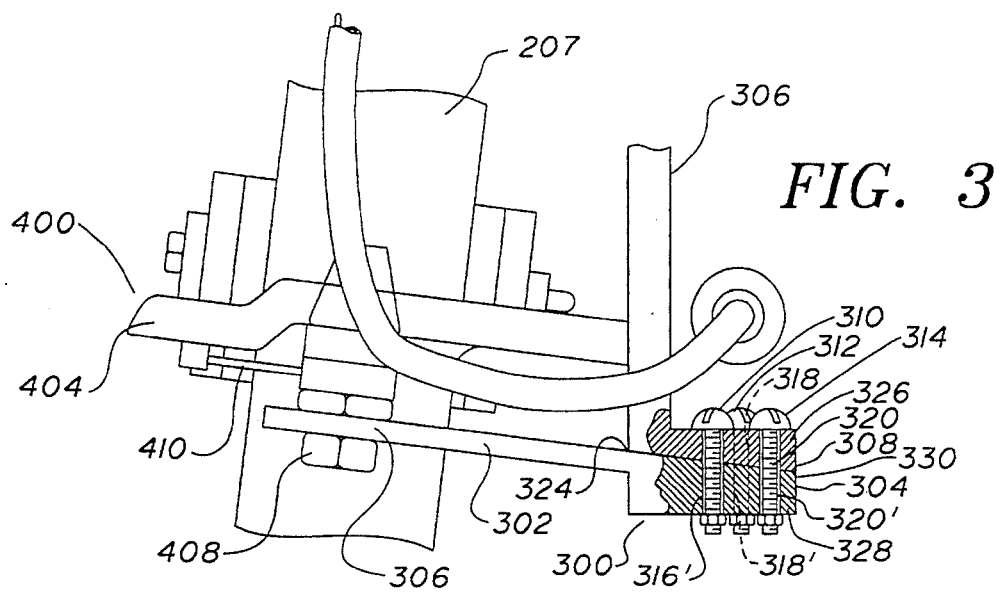
FIG. 3 is an enlarged fragmented front elevational view partially cut away showing one embodiment of the connecting assembly for the brake member of the present invention taken in the direction of line 3—3 in FIG. 2.

As shown in FIGS. 1–3, the brake assembly 400 of the first apparatus 10 is a conventional-type caliper brake 402 with a pair of caliper arms 404, 406 pivotally mounted on a bolt 408 which acts as an axis of rotation for the two arms. The ends 403, 405 of the two caliper arms 404, 406, respectively, are biased apart from each other about the bolt 408 in a conventional manner by means of a biasing wire (not shown, but shown as the biasing wire 410' in the second brake apparatus 12 depicted in FIG. 2).

The two caliper arm ends 403, 405 have fitted thereon on brake pads 412, 414. The use of such pads is known in the art, and it is preferred that the pads be able to be replaceable when worn. The caliper arms 404, 406 surround the main wheel 206 and are positioned so that the pads 412, 414 urge against the rim 204 of the wheel in order to clamp and prevent rotation of the wheel when the caliper arms are caused to overcome the biasing force of the biasing wire urging them apart and pivot toward the rim.

As shown most clearly in FIG. 3, the caliper brake 402 is positioned so that the pivot bolt 408 is parallel with the tire 207 mounted on the main wheel 206 and the caliper arms are substantially parallel to and horizontally aligned with the axle 214 of the wheel. The pivot bolt 408 is mounted onto the connecting assembly 300 and passes through a connecting plate 302 of the connecting assembly 300. The base end 304 of the connecting plate 302 is attached to the base end 308 of a connecting rod 306 by three screw bolt and nut combinations 310, 312, 314 passing through aligned bores 316, 316', 318, 318', 320, 320', respectively. The connecting rod 306 extends downwardly vertically from the mounting assembly 100.

In order to position the pivot bolt 408 so that it is parallel to the tire 207, the connecting plate 302 extends outwardly away from its base 304 at an angle equivalent to and parallel to the axle 214 or axis or rotation of the wheel 206. The connecting plate 302 is of sufficient length that the pivot bolt 408 through the plate can be aligned with the centerline of the tire 207. The top surface 324 of the connecting plate 302 extension of the top surface of its base end 304; and accordingly, the top surface 324 of the base is angled. In order for the top surface 326 of the base end 308 of the connecting rod 306 to be parallel to the bottom surface 328 of the base end 304, the bottom surface 330 of the base end 308 must be formed at an angle complimentary to the angle of the top surface 324. This orientation of the two bases 304, 308 is necessary so that the bores 316, 316', 318, 318', 320, 320' can be vertically and coaxially aligned with each other.

Figure 4:
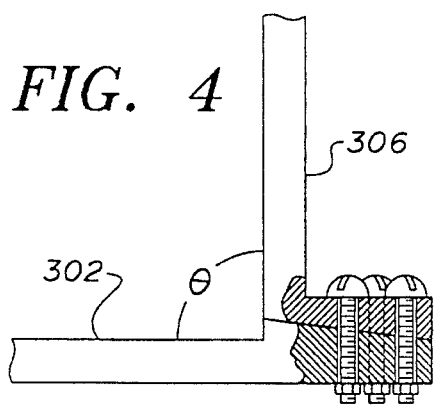
FIG. 4 is a fragmented front elevational view partially cut away of a second embodiment of the connecting assembly for the brake member of the present invention.
Figure 5:
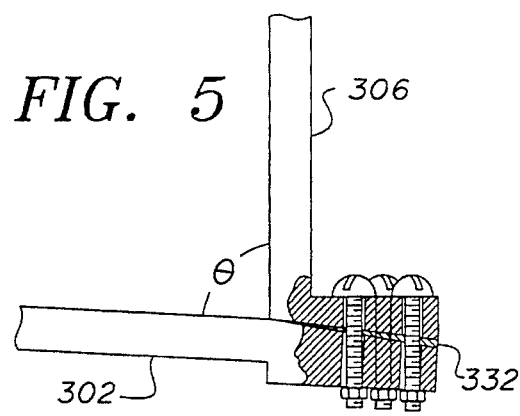
FIG. 5 is a fragmented front elevational view partially cut away of a third embodiment of the connecting assembly for the brake member of the present invention.

In the two alternative embodiments of the connecting assembly 300 shown in FIGS. 4 and 5, the angle Θ by which the connecting plate 302 extends from the connecting rod 306 is changed from the angle shown in FIG. 3. By varying the angle Θ, the orientation of the pivot bolt 408 can be varied to correspond to a change in the camber angle of the wheel 206. For example, in FIG. 4, the angle Θ of the connecting plate 302 is changed to 90° by turning the connecting plate 302 over so that the bottom surface 328 of the base end 304 abuts the bottom surface 330 of the base end 308. By so changing the angle of the connecting plate 302, the pivot bolt 408 can vertically position the brake, such as when there is no camber to the wheel 206 and the wheel is vertical. In the embodiment shown in FIG. 5, a wedge 332 is placed between the bottom surface of the base 308 of the connecting rod 306 and the top surface 324 of the base 304 of the connecting plate 302 when an even greater angle Θ is desired. The wedge 332 of appropriate thickness is inserted between the two bases to increase the angle established between the two bases 304, 308. Thus by using a wedge between the bases, the connecting assembly can be adjusted to accommodate different camber angles of the wheel, at least to the point where the bores 316, 316', 318, 318', 320, 320' remains substantially aligned in order to receive the requisite bolts therethrough.

The upper end 340 of the connecting rod 306 is connected to the mounting assembly 100 and is preferably integrally formed therewith, even though it is understood that other means of connecting the connecting rod to the mounting assembly are possible. The connecting rod 306 is of sufficient length to allow the brake assembly 400 on the connecting plate 302 to be positioned directly in front of the wheel 206 and be aligned with the central axis of rotation or hub of the wheel.

As shown in FIG. 8, the mounting assembly 100 includes first and second clamping members 102, 104 which are designed to fit around and clamp the tubular siderail 202 of the wheelchair 200 therebetween. The first clamping member 102 is provided with an arcuate interior surface 106 at the upper inside edge thereof which is designed to at least partially surround the siderail 202. Likewise, the upper inside edge of the second clamping member 104 is also formed with an arcuate interior surface 108 which is substantially opposite the surface 106 of the first clamping member when the first and second clamping members are positioned on opposite sides of the siderail 202. The inside edge of the second surface 108 is also provided with a notch 110 along the longitudinal length thereof. The notch 110 provides a space which accommodates the sling-like support 216 for the seat cushion 218 that forms the seat of the wheelchair. The support 216 wraps around the siderail 202 and has a rectangular rod-like member at the edge thereof through which bolts or screws are inserted to attach the support to the siderail. This is a known construction for the support 214, and the notch 110 accommodates this rectangular rod so that the clamping member 104 on either side of the notch can fit more snugly against the siderail 202. The notch 110 also makes it possible for the second clamping member 104 to fit around any bolts or other projections on the siderail, even if the rod-like member for the support for the seat cushion does not get in the way.

Near the bottom edge 112 of the second clamping member 104, a projection 114 extends away from the clamping member 104 toward the confronting face 118 of the first clamping member 102, thereby creating a spacing 120 between the two confronting faces 118, 122 of the first and second clamping members when the two clamping members are positioned around the siderail 202 of the wheelchair.

The outer face 124 of the second clamping member 104, is formed with a second groove or notch 126 which receives the brake lever plate 502 of the brake actuating assembly 500. In particular, as shown in FIG. 8, the brake lever plate 502 has a projection 504 along the side thereof which fits into the second notch 126 on the second clamping member 102. The sidewall 506 of the lever plate 502 abuts the wall 124 of the second clamping member when the projection 504 is inserted into the notch 126.

The first and second clamping members 102, 104 are urged toward each other so that they form a clamping action around the siderail 202 by means of a bolt 128 and a screw bolt 130 which pass through the two clamping members. As shown in FIG. 8, the bolt 128 has a head 130 which fits into a recess 132 on the side of the second clamping member 104 and threaded body portion 134 which extends through aligned bores 140, 140' in the first and second clamping members. A nut 142 is threaded onto the end of the threaded body portion 134 and a washer 144 is positioned around the threaded portion of the bolt 128 between the nut 142 and the outer wall of the first clamping member 102. Since the aligned bores 140, 140' have a diameter less than the diameter of the recess 132 in the second clamping member and smaller than the head 130 of the bolt 128 positioned in the recess 132, tightening the nut 142 pulls the two clamping members close together and creates a clamping of the siderail 202 between the arcuate surfaces 106, 108 of the two clamping members.

The connection between the two clamping members, and affixing of the brake lever plate 502 against the second clamping member, is further secured by the screw bolt 130 extending through second aligned bores 146, 146' in the two clamping members. The screw bolt 130 has a head 148 adjacent the outer surface of the first clamping member 102 and a threaded body 150 which extends through the aligned bores 146, 146' and into a threaded bore 420 in the brake lever plate 502. Rotation and tightening of the screw bolt 130 not only threads the bolt into the lever plate 502 and thereby secures the bolt to the lever plate, it also urges the first and second clamping members closer together, until no further movement of the clamping members is possible due to the positioning therebetween of the siderail 202 and the projection 114 on the second clamping member. The projection 114 allows the arcuate surface 106 to squeeze lightly around siderail 202 as the nut 142 is tightened on the bolt 128 and more securely hold against the siderail than would be possible if the two arcuate surfaces 106, 108 were drawn evenly together. If the arcuate surfaces were to simply surround the sidearm, it might be possible for the mounting assembly to rotate. This is less likely to happen if the arcuate surface is caused to pivot inward slightly because of the projection 114.

The caliper brake 402 is connected by a cable 506 to an operating brake lever 508 of the actuation assembly 500. The lever 508 is pivotally mounted on the brake lever plate 502 by means of a pivot pin 510 passing through the brake lever 500 and secured in the lever plate. The cable, as shown in FIGS. 6–8 includes an outer sheath 512 and an inner coaxial wire cable 514 slidably fitted within the sheath. Fixed to the end of the wire cable 514 and fitted within the brake lever 508 is a cylindrical fitting 516. This fitting 516 slides into and is held within a cutout 518 in the lever 508. (See FIG. 8.) The cutout 518 includes a first cutout portion 520 which opens into the lever from the inside edge of the lever adjacent the lever plate 502, parallel to the axis of rotation of the lever. The cutout 518 further includes a second, smaller, cutout portion 522 transverse to the first cutout portion 520 which is wide enough for the cable wire 514 to fit therethrough.

At the end of the outer sheath 512 shown in FIG. 6 is a metal cap 517 press fitted thereto and loosely mounted within a knurled end piece 525 at the base of a threaded extension through which the cable 514 extends toward the fitting 516. At the opposite end of the sheath 512 is a second threaded extension 525 threaded through the end 409 of caliper arm 406. The cable 514 extends through the extension 527 to the end 407 of the caliper arm 404 where it is secured in any known manner. The end of the sheath 512 at the second threaded extension 527 is loosely fitted within the extension 527. The threaded extension 524 has a threaded snug nut washer 526, which is knurled around its outer circumference, threaded thereon. The threaded extension is designed to be threaded into a vertical threaded opening 528 in the lever plate 502.

By rotating the end piece 525, the threaded extension rotates within the vertical opening 528 and moves upward or downward therein depending on the direction of rotation of the end piece.

By rotating the first threaded extension 524 downward at the knurled end piece 525, the metal cap 517 within the end piece 524 urges against the sheath 512 and forces the sheath 512 surrounding the cable 514 against the second threaded extension 527, thereby causing the caliper ends 406, 407 to move closer together and thus causing the brake pads 412, 414 to move closer toward the rim 204 of the wheel.

The significance of this ability to move the brake pads toward the rim is the ease with which the brakes can be adjusted to accommodate wear of the brake pads. No tools are necessary; all that is required is rotation of the extension 524 downward as the brake pads wear. When the threaded extension 524 is positioned, the snug nut 526 is rotated upwardly against the lever plate 502 to hold the extension in position once the desired position is achieved.

At the top of the lever plate is a locking lever 529 pivotally mounted thereon. As best shown in FIGS. 6 and 7, the locking lever has a projection 530 at the base thereof which extends directly behind the lever 508. Connected to the projection 530 is a biasing spring 532 which is connected at its opposite end by means of a screw to the lever plate 502. The biasing tension of the spring 532 continuously urges the projection 530 against the edge of the lever 508, and when the brake lever 508 is urged downward during braking (as will be discussed more fully hereinafter) the biasing spring pulls the projection 530 under the brake lever (FIG. 7) and thereby prevents the brake lever from returning to its previous position until the locking lever 529 is urged forward at the knob 535 against the force of the biasing spring, and the projection 530 is rotated out from under the brake lever 508.

The knob 535 has a slight "thumb" depression on its upper surface to facilitate pushing and to distinguish it from the smooth upper surface of the brake lever.

A second embodiment of the locking lever 529 is shown in FIG. 9. The lever 529 functions essentially the same as lever 529 shown in FIGS. 6 and 7, except for the biasing force of the spring 532'. Unlike spring 532 which is a tension spring that pulls the projection 530 toward and underneath the lever 508, the spring 532' is a compression spring seated in a hole 534 in the lever plate 502 underneath the locking lever 529. Because the spring 532' is a compression spring (rather than a tension spring like 532), the spring 532' urges the locking lever 529 to rotate about its axis of rotation 531 so that the projection 530' is continuously urged against the locking lever 529.

In this second embodiment shown in FIG. 9, the forward and downward braking movement against the brake lever 508 causes the brake lever to pivot and allows the locking lever 529 under the urging of the spring 532' to rotate about its axis 531 so that the projection 530 moves underneath the end of the braking lever. As with the first embodiment, the braking lever remains locked in the braking position until the locking lever is released by pushing forward on the locking lever at the thumb depression formed therein.

By positioning the caliper arms 404, 406 around the rim 204 of the wheel 206 and clamping the mounting assembly 100 around the siderail 202 as described above, the braking apparatus 10 is affixed to the wheelchair around one of the wheels so that it can control the rolling movement of that wheel and thus brake and/or lock in position that wheel upon the application of a forward and downward motion against the brake lever 508. As presented earlier, although the invention is capable of braking the motion of the wheelchair with just the mounting of the one braking apparatus 10 onto one of the siderails, in an alternative embodiment of the invention, the second braking apparatus 12 can also be attached to the opposite siderail 208 in order to apply clamping force against the second wheel rim, thereby more evenly and securely controlling the rolling motion of the wheelchair.

Rather that provide a second brake lever on the second braking apparatus 12 (which is possible), in the alternative embodiment shown in FIG. 2, a second co-axial cable 902 (as shown by the phantom lines in FIG. 2) is provided. A bracket 904 is mounted onto the caliper arm 406 by means of the same screw assembly 415 which affixes the brake pad 414 to the caliper arm 406. The end of the cable 902 has fittings 906, 908 similar to the threaded extension 524 and snug nut washer 526 which connect the cable 902 to the bracket 904. These fittings allow for connection to the bracket and adjustment of tension as discussed with respect to the cable 514 and the lever arm 508. The inner cable wire 910 extends through the threaded extension 906 and is clamped to the caliper arm 404 at the same location as the inner wire 514. This clamping of the inner wires, as seen at the clamp site 912 on the second brake assembly 12, is done in any conventional manner known in the art, such as by an adjustable clamp which holds the wire between opposing surfaces.

To effect braking with the apparatus of the invention once it is positioned on the siderail 202, the brake lever 508 is urged forward and down, thereby pulling against the end of the inner cable 514 at the fitting 516 and causing the caliper brake arms 404, 406 to urge toward each other at the ends 407, 409. Furthermore, the brake arms 404, 406 pivot about the pivot bolt 408 and urge the brake pads 412, 414 toward the wheel rim 204 until the wheel rim is securely clamped therebetween and rotation of the wheel is prevented. If the second braking apparatus 12 is provided, the pulling together of the ends 407, 409 will also pull the inner wire 910 of the second cable 902 and cause a similar pivoting and clamping motion against the second wheel.

The downward pivoting motion of the lever arm 508 also allows the locking lever 529 under the biasing action of the spring 532 to rotate so that the projection 530 moves underneath the end of the pivot arm 508 as shown in FIG. 7, thus prohibiting the release of tension on the cable until the locking lever 529 is rotated from beneath the lever arm. This occurs by pushing forward against the knob 535 of the locking lever and overcoming the biasing tension of the spring 532. Once the locking lever is rotated forward, the lever arm 508 can pivot rearward as the caliper arms 404, 406 are urged apart under the influence of the biasing spring (as shown in FIG. 2 with regard to apparatus 12) affixed thereto. This automatic rotation of the locking lever projection 530 under the brake lever 508 is especially important when the wheelchair is moving up or down an inclined surface, since it locks the wheels and prevents movement of the wheelchair whenever pressure is released from the brake lever 508. This is an especially important safety feature. This forward and downward motion against the lever arm 508 is an important distinction over prior caliper brakes. By positioning the lever arm 508 essentially in line with the tire 206 (FIG. 1), braking can be accomplished at the end of the sweep of the forward arm motion which rotates the wheel or by simply leaning forward in the chair with a hand on the lever arm. Simplicity and ease of actuation are especially important to the operation of such a device, since many wheelchair-bound persons have severely limited ranges of motion, other than just the inability to walk. Prior devices requiring rearward and downward gripping motion against the lever arm are not as easily operated.

Figure 10:
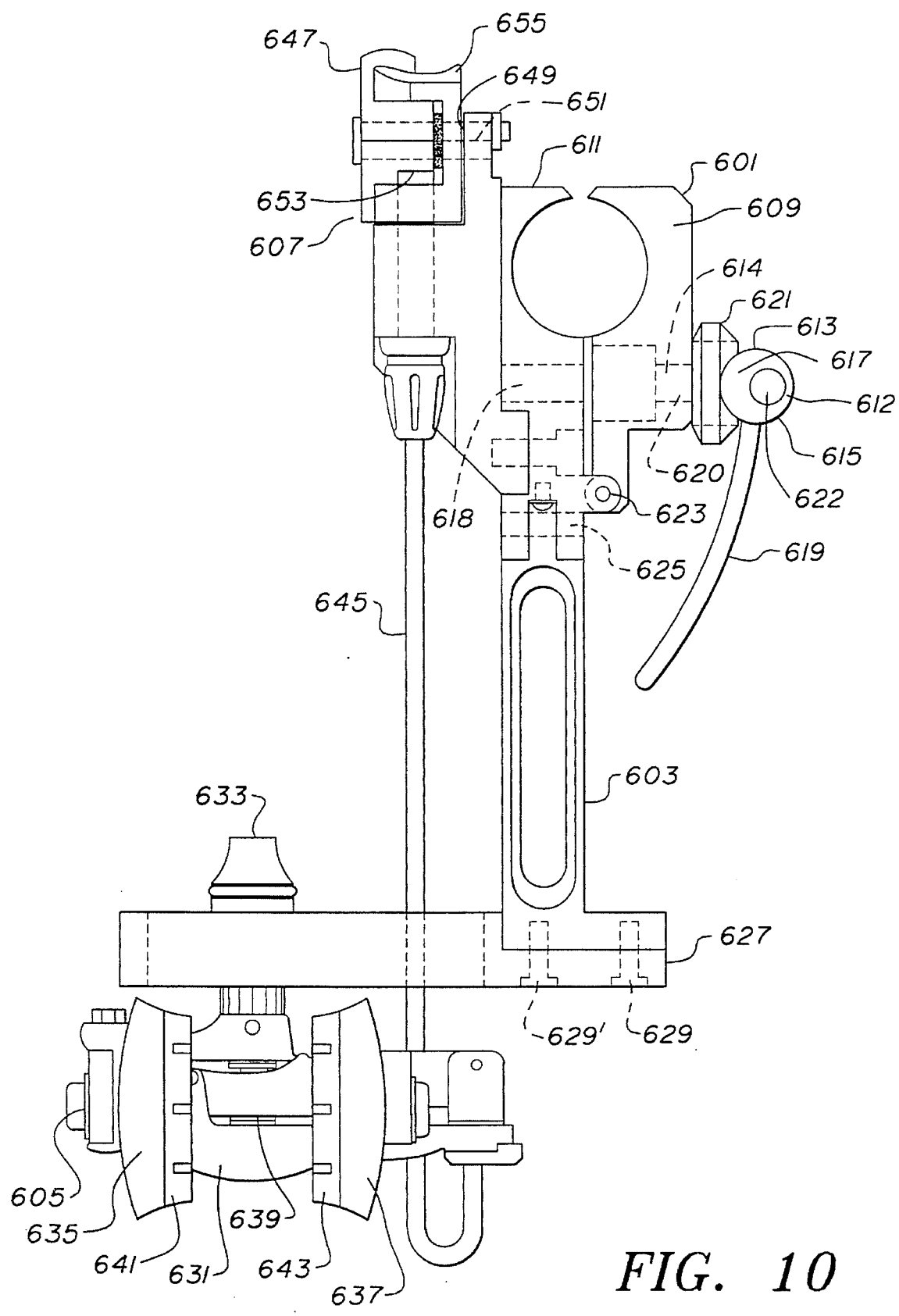
FIG. 10 is a front view of a preferred embodiment of the wheelchair brake of the present invention which may be mounted to the left hand side of a wheelchair.

Referring now to FIG. 10 there is shown a preferred embodiment of the wheelchair brake of the present invention which may be mounted to the left hand side of a wheelchair. A corresponding apparatus for attachment to the right hand side of a wheelchair would be a mirror image of the apparatus of FIG. 10. The wheelchair brake as described herein is designed for use with a wheelchair having a pair of rotatable wheels and a frame member, such as a siderail, suitable for attachment of the braking apparatus. The braking apparatus includes a mounting assembly 601 which can be attached to one of the siderails of the frame of a wheelchair. An optional brake bracket 603 attached to the bottom of the mounting assembly 601 can be employed to interconnect the mounting assembly 601 with a brake assembly 605 which surrounds the rim of one of the main wheels of the wheelchair. The brake assembly may utilize a variety of frictional braking means for slowing the rotation of at least one of the wheels of the wheelchair and in preferred embodiments, such as that illustrated in FIG. 10, the frictional braking means employed is a caliper brake.

A preferred actuating assembly 607 can be connected to the mounting assembly 601 and can be further connected to the braking assembly 605. This permits the braking assembly to clamp against and grip the rim of a main wheel of the wheel chair. Clamping of the brake assembly 605 against the rim can prevent the wheel from rotating or, with an applied pressure less than the full clamping force, the wheel rotation can be slowed down. This force can be applied to both wheels, or just one wheel at a time, or with uneven pressure on each wheel, to control speed and direction.

As further shown in FIG. 10 the mounting assembly 601 has a first frame clamp member 609 and a second frame clamp member 611. A quick release assembly 613 draws together the first frame clamp member 609 and the second frame clamp member 611 by moving the first frame clamp member 609 closer to the second frame clamp member 611, thereby compressing the first and second frame clamp members around a wheelchair frame member. In preferred embodiments, the frame clamping members are separate pieces brought together by the quick release assembly. However, it is expected that the frame clamp members could be made of materials such as thermosets, thermoplastics or high density elastomeric material and consist of a single piece construction having a first frame clamp section and a second frame clamp section.

The quick release assembly 613 includes a shaft 614 which is connected at a first end 618 to the second frame clamp member 611. In certain embodiments, shaft 614 may be a threaded shaft which is attached by these threads to a mating aperture 618 within the second frame clamp member 611. Shaft 614 passes through a bore in the first frame clamp member and extends through the first frame clamp member 609 to a second end 620 which has a cam 615 mounted thereon. The cam 615 has a cam lobe 617 and is mounted on a cam mounting pin 622 to the second end 620 of the shaft. A quick release lever 619, which is designed for hand operation, is attached to the cam 615. The quick release lever rotates the cam 615 about a first axis which is substantially perpendicular to the central axis of shaft 614. As illustrated in FIG. 10, this axis is manifested in the axis of the cam mounting pin 622. The cam 615 is rotated such that the cam lobe 617 bears against a quick release assembly collar 621 thereby providing a compression force causing the first frame clamp member 609 to move toward the second frame clamp member 611 thereby drawing the first and second frame clamp members together to securely hold the wheelchair frame. A frame clamp pivot 623 allows the first frame clamp member 609 to rotate about an axis parallel to the axis of the wheelchair siderail used to mount the wheelchair brake. The use of the frame clamp pivot 623 allows the mounting assembly 601 to be secured with only the quick release assembly 613, which is an expedient that will be appreciated by a wheelchair user.

The preferred brake bracket 603 can include a bracket hinge 625. The bracket hinge allows the brake bracket 603 to rotate about an axis substantially parallel to the axle of the wheelchair wheel. In a preferred embodiment, the bracket hinge 625 has three locking positions. In a first position the brake assembly 605 is in front of and away from the wheelchair's main wheel to allow removal and installation of a main wheel of a wheelchair. In a second position the brake bracket 603 is substantially vertical. This position is the standard operating position for the wheelchair brake. In a third position the brake bracket is pulled back against the frame of the wheelchair to facilitate transportation of the wheelchair. Spring pins may be used in frame clamp pivot 623 and bracket hinge 625.

The brake bracket 603 can be attached to a caliper mount 627. The caliper mount may be attached to the brake bracket 603 by a variety of fastening means known to those skilled in the art such as the illustrated caliper mounting screws 629, 629'.

The caliper mount allows the user to adjust the position of the caliper brake to optimize the ability of the caliper brake to engage the wheel rim. The caliper brake 631 may be positioned using the caliper positioning bolt 633 such that the caliper brake 631 is properly oriented relative to the wheelchair wheel. The caliper brake 631 employed in the present invention is preferably a conventional type caliper brake, of the type used in bicycles, with a pair of caliper arms 635, 637 pivotally mounted on a pivot bolt 639 which acts as an axis of rotation for the two arms. The ends of the two caliper arms 635, 637 are biased apart from each other about the bolt 639 in a conventional manner by means of a biasing wire (not shown, but shown as the biasing wire 410 in the second brake apparatus depicted in FIG. 2.)

The two caliper arm ends 635, 637 have fitted thereon brake pads 641, 643. The use of such pads is known in the art and it is preferred that the pads be able to be replaced when worn. The caliper arms 635, 637 embrace a main wheel of the wheelchair and are positioned so that the pads 641, 643 urge against the rim of the wheel in order to clamp and prevent rotation of the wheel when the caliper arms are caused to overcome the biasing force of the biasing wire. This allows the caliper arms to pivot towards the rim. In addition to caliper arm brakes, this invention can include piston-operated or other mechanical, hydraulic or pneumatic braking systems.

The actuating assembly 607 is preferably connected to the brake assembly 605 by a brake cable 645. The actuating assembly has a lever arm 647 which is capable of pulling the cable 645 and actuating the caliper brake. The lever arm 647 is attached to a lever plate 649 by pivoting means 651 and is connected at its first end 653 to the cable 645. The actuating assembly 607 further includes a brake locking means 655 which is engagable with the actuating means 607 for locking the actuating means when the caliper brake 605 engages the wheel. In certain embodiments best understood by reference to FIG. 9, the brake locking means may be prevented from locking the actuating means by use of a mechanism which blocks the projection 530 from moving underneath the pivot arm 508.

Figure 11:
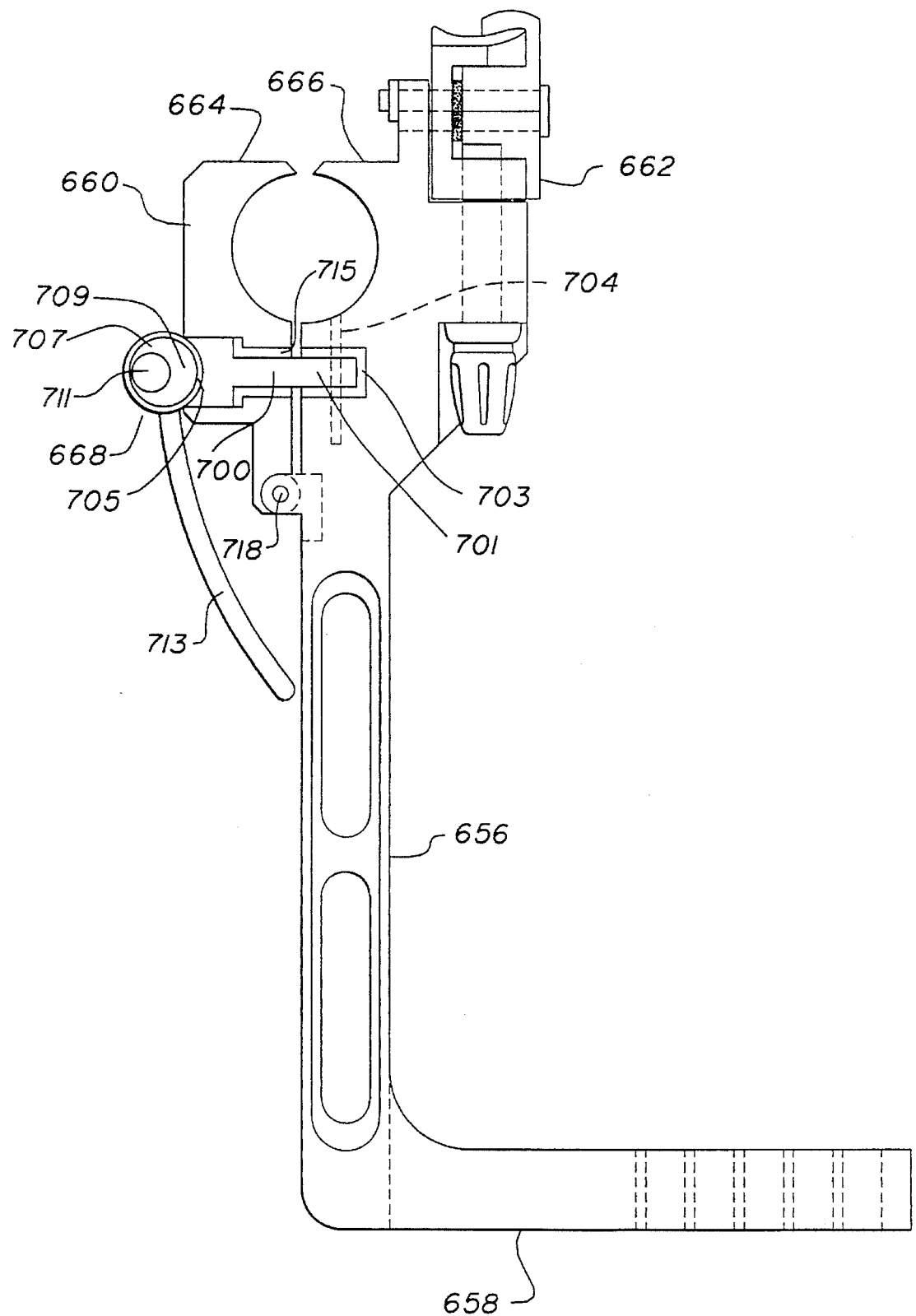
FIG. 11 is a front view of a preferred embodiment of the wheelchair brake of the present invention having a cast brake mounting assembly which may be mounted to the right hand side of a wheelchair.

Referring now to FIG. 11, there is shown a preferred embodiment of the wheelchair brake of the present invention which incorporates a cast brake mounting assembly which may be mounted to the right hand side of a wheelchair. A corresponding apparatus for attachment to the left hand side of a wheelchair would be a mirror image of the apparatus of FIG. 11. This embodiment provides for reduced weight and production cost by providing a second frame clamp member 666, a brake bracket 656 and caliper mount 658 which may be cast in a single piece.

This embodiment of the inventive braking apparatus includes a mounting assembly 660 which is connected to one of the siderails of the frame of a wheelchair. An actuating assembly 662 is connected to the mounting assembly 660 and is further connected to a braking assembly (not shown), such as the brake assembly 605 shown in FIG. 10, which is mounted on caliper mount 658 by a caliper positioning nut such as that shown in FIG. 10. The actuating assembly 662 causes the braking assembly to clamp against and grip the rim of a main wheel of a wheelchair. The actuating assembly is substantially identical to the apparatus shown in FIG. 10.

As further shown in FIG. 11, the mounting assembly 660 has a first frame clamp member 664 and a second frame clamp member 666. Frame clamp member 666 is contiguous with brake bracket 656 and caliper mount 658 and is part of the single cast construction thereof. A quick release assembly 668 draws together the first frame clamp member 664 and the second frame clamp member 666 by moving the first frame clamp member 664 closer to the second frame clamp member 666. The quick release assembly includes a shaft 700 which is connected at a first end 701 to the second frame clamp member by a pivoting means 703. The pivoting means 703 is mounted on the second frame clamp member 666 and allow the shaft 700 to pivot about an axis of rotation which is substantially perpendicular to the long axis of the shaft 700. The quick release assembly 668 incorporating the shaft 700 mounted on pivoting means 703 is a preferred embodiment of the quick release assembly used in the wheelchair brakes disclosed in the present invention. In this embodiment, the pivoting means 703 may utilize a spring pin 704 to serve as the pivoting axis.

The second end 705 of the shaft 700 has a cam 707 mounted thereon. The cam 707 has a cam lobe 709 and is mounted on a cam mounting pin 711. A quick release lever 713 is attached to the cam 707. The quick release lever rotates the cam 707 about the axis of the cam mounting pin 711. The cam 707 is rotated such that the cam lobe 709 bears against, and compresses the first and second frame clamp members 664 and 666 to compress against the siderail, or other mounting area, and securely hold the wheelchair frame. When in this locked position, the shaft 700 is positioned in a coaxially aligned cavity 715 formed in the first and second frame clamp members. To open the mounting assembly 660, the quick release lever 713 is rotated about the cam mounting pin 711 such that the cam lobe 709 no longer bears against the first frame clamp member. The shaft 700 is then pivoted about its long axis via the pivoting means 703 until the shaft is outside of the cavity 715. The first frame clamp member 664 is then free to rotate about frame clamp pivot 718. A spring pin may be used in frame clamp pivot 718.

Figure 12:
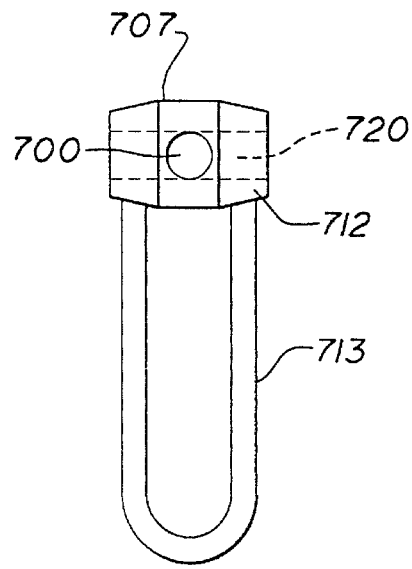
FIG. 12 is a side view of the portion of the quick release assembly illustrated in FIG. 11.
Figure 13:
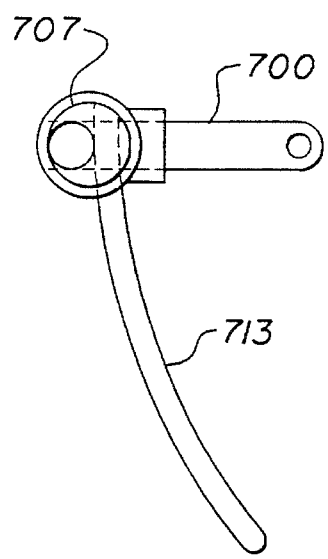
FIG. 13 is a front view of the quick release assembly illustrated in FIG. 11.

FIGS. 12 and 13 show in greater detail components of the quick release assembly 668 of FIG. 11. In particular, FIG. 12 illustrates cam 707, quick release lever 713 and a bore 720 through which cam mounting pin 711 is inserted to secure said cam mounting pin 711 to said second end 705 of shaft 700. FIG. 13 shows a view of components of the quick release assembly illustrating cam 707, quick release lever 713 and shaft 700.

Figure 14:
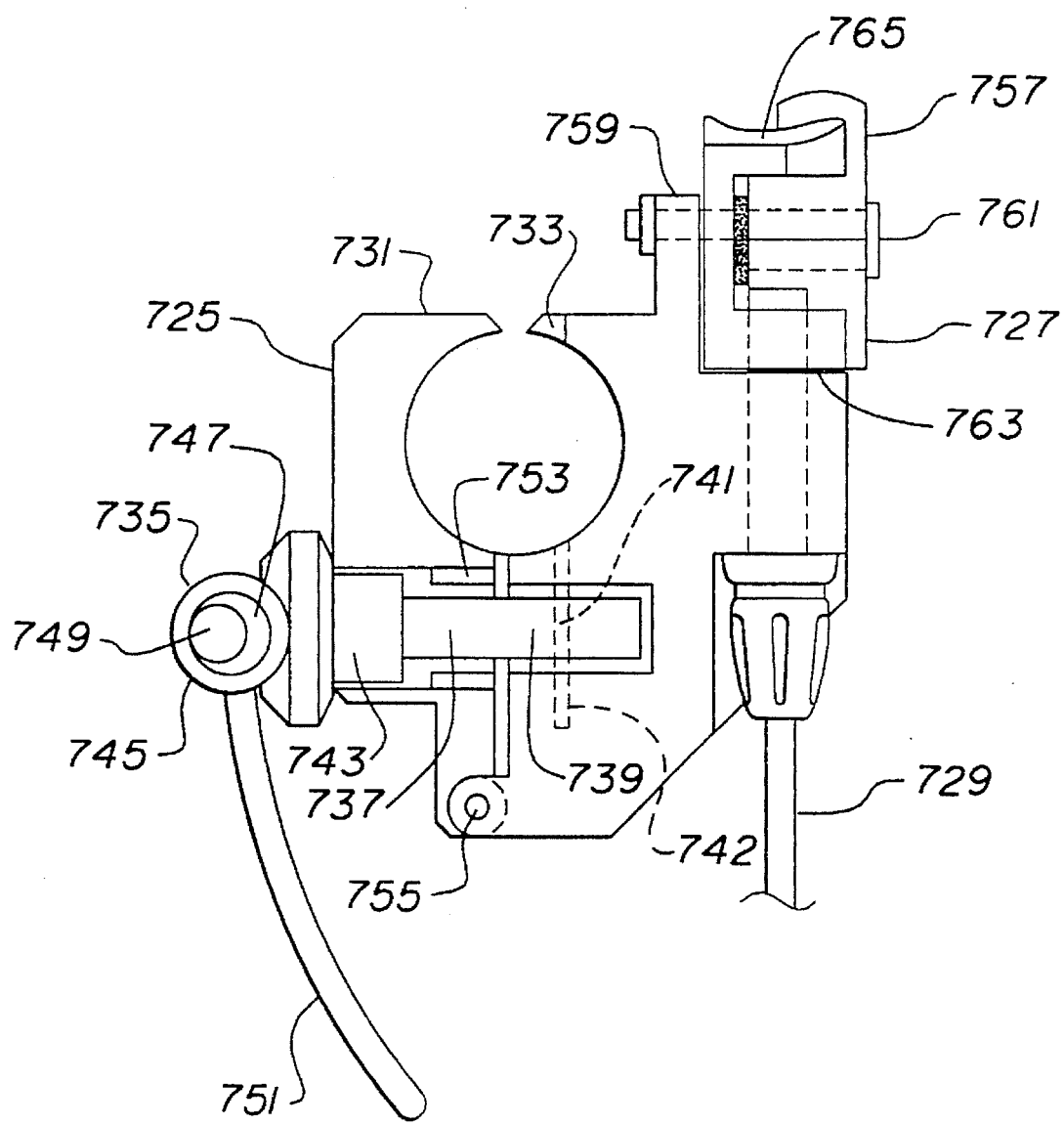
FIG. 14 is a front view of the brake actuating mechanism and quick release mounting assembly of the present invention of a preferred two-part embodiment of the wheelchair brake of the present invention which may be mounted to the right hand side of a wheelchair.

Referring now to FIG. 14, there is shown a preferred embodiment of the wheelchair brake of the present invention which may be mounted to the right hand side of a wheelchair. A corresponding apparatus for attachment to the left hand side of a wheelchair would be a mirror image of the apparatus of FIG. 14. In this embodiment, the actuating assembly may be separated from the caliper brake assembly and is connected thereto by a brake cable. This embodiment provides the user with a wide variety of options in positioning both the actuating assembly and the caliper brake assembly. As an example in some instances, it may be desirable to mount the actuating assembly on the rear of the wheelchair where an attendant who is pushing the wheelchair could activate and lock the brakes. As another example, some modern wheelchairs, especially racing wheelchairs, may have wheels that are cambered. In some instances, the camber of the wheel may make mounting of the wheelchair brake embodiment of FIG. 10 inconvenient for the user. It is believed that a two-part embodiment of the wheelchair brake of the present invention which allows one to mount the actuating assembly and the brake assembly separately is more suitable for certain wheelchair designs.

Another advantage offered by the use of the apparatus shown in FIG. 14 is the option of providing a wheelchair with caliper brakes which are mounted to the wheelchair frame using more conventional mounting apparatus such as bolts to secure the caliper brake to the frame. The user could then install the brake actuating apparatus as shown in FIG. 14 on the wheelchair frame in a desired position. This would allow the wheelchair manufacturer to sell a given chair with caliper brakes that are designed and positioned for optimum effiency for a given wheelchair model but allow the wheelchair user to determine the best positioning of the brake actuating mechanism.

The braking apparatus includes a mounting assembly 725 which is connected to one of the siderails of the frame of a wheelchair. An actuating assembly 727 is connected to the mounting assembly 725 and is further connected to a braking assembly as will be described hereinbelow in FIG. 15 by cable means 729. The actuating assembly 727 causes the braking assembly to clamp against and grip the rim of a main wheel of a wheelchair.

As further shown in FIG. 14, the mounting assembly 725 has a first frame clamp member 731 and a second frame clamp member 733. A quick release assembly 735 draws together the first frame clamp member 725 and the second frame clamp member 733 by moving the first frame clamp member 725 closer to the second frame clamp member 733. The quick release assembly includes a shaft having first and second ends. The first end of the shaft 739 is connected to the second frame clamp member 733 by pivoting means 741. In preferred embodiments, pivoting means 741 may utilize a spring pin 742. The pivoting means 741 are mounted on the second frame clamp member 733 and allow the shaft 737 to pivot about an axis of rotation which is substantially perpendicular to the long axis of the shaft 737.

A second end 743 of shaft 737 has a cam 745 mounted thereon. The cam 745 has a cam lobe 747 and is mounted on a cam mounting pin 749. A quick release lever 751 is attached to the cam 745. The quick release lever 751 rotates the cam 745 about the axis of the cam mounting pin 749. The cam 745 is rotated such that the cam lobe 747 bears against the first frame clamp member 731 thereby causing the first frame clamp member 731 to move toward the second frame clamp member 733 thereby drawing the first and second frame clamp members together around a siderail, etc., to securely hold the wheelchair frame. When in this locked position, the shaft 737 is positioned in a coaxially aligned cavity 753 formed in the first and second frame clamp members. To open the mounting assembly 725, a quick release lever 751 is rotated about the cam mounting pin 749 such that the cam lobe 747 no longer bears against the first frame clamp member. The shaft 737 is then pivoted about its long axis via the pivoting means till the shaft is outside of the cavity 753. The first frame clamp member 731 is then free to rotate about frame clamp pivot 755. In preferred embodiments frame clamp pivot 755 utilizes a spring pin.

An actuating assembly 727 is connected to the mounting assembly 725. The actuating assembly has a lever arm 757 which is capable of pulling a brake cable 729 thereby actuating a caliper brake such as that illustrated in FIG. 15. The lever arm 757 is attached to a lever plate 759 by pivoting means 761 and is connected at its first end 763 to the cable 729. The actuating assembly 727 further includes a brake locking means 765 which is engagable with the actuating assembly 727 for locking the actuating assembly when the caliper brake engages the wheel.

Referring now to FIG. 15, there is shown a preferred embodiment of the wheelchair brake of the present invention which may be used in conjunction with the apparatus shown in FIG. 14. In particular, FIG. 15 illustrates the braking assembly portion of a preferred embodiment of the wheelchair brake of the present invention. This embodiment allows the wheelchair user more flexibility in the positioning of the braking caliper assembly. As described hereinabove, this embodiment is particularly useful when one desires to mount the actuating assembly at the back of a wheelchair so that an attendant pushing the wheelchair can stop the chair and also in racing chairs where the wheels are cambered. As shown in FIG. 15, there is provided a mounting assembly 768 having a first frame clamp member 771 and a second frame clamp member 773. A quick release assembly 775 draws together the first frame clamp member 771 and the second frame clamp member 773 by moving the first frame clamp member 771 closer to the second frame clamp member 773. The quick release assembly 775 includes a shaft 777 which is connected at a first end 779 to the second frame clamp member 773 by pivoting means 781. The pivoting means 781 are mounted on the second frame clamp member 773 and allow the shaft 777 to pivot about an axis of rotation which is substantially perpendicular to the long axis of the shaft 777. The quick release assembly 775 is one possible embodiment of the quick release assembly, a second embodiment of which will be described in FIG. 17. Returning now to FIG. 15, there is further shown proximal to the second end of the shaft 783 a collar 785. The second end of shaft 777 extends through collar 785 and at the end of the second end of the shaft there is attached a cam 787 having a cam lobe 789. The cam is mounted on to the second end of shaft 777 by a cam mounting pin 791. A quick release lever 793 is attached to the cam 787. The quick release lever rotates the cam 787 about the axis of the cam mounting pin 791. The cam 787 is rotated such that the cam lobe 789 bears against collar 785 which in turn bears against the first frame clamp member 771 thereby causing the first frame clamp member 771 to move toward the second frame clamp member 773 drawing the first and second frame clamp members together to securely hold a wheelchair frame. A frame clamp pivot 795 allows the first frame clamp member 771 to rotate about an axis parallel to the axis of the wheelchair siderail used to mount the mounting assembly 768. In preferred embodiments, frame clamp pivot 795 utilizes a spring pin. The use of the frame clamp pivot 795 allows the mounting assembly 768 to be secured with only the quick release assembly 775. A caliper mount 797 is mounted to the second frame clamp member 773. The caliper mount 797 is inserted in caliper mount receiving bore 798 present in the second frame clamp member 773 and is secured to the second frame clamp 773 member at its second end 799. This securing can be accomplished by a retention pin 800 which is inserted into caliper mount receiving bore 802 in the second end 799 of the caliper mount. The caliper mount 797 allows the user to adjust the position of the caliper brake 801 to optimize the ability of the caliper brake to engage the wheel rim. The caliper brake 801 may be positioned using the caliper positioning bolt 803 such that the caliper brake 801 is properly oriented relative to the wheelchair wheel. The caliper brake 801 employed in the present invention is preferably a conventional type caliper brake with a pair of caliper arms 805, 807 pivotally mounted on a pivot bolt 808 which acts as an axis of rotation for the two arms. The end of the two caliper arms 805, 807 are biased apart from each other about the pivot bolt 808 in a conventional manner by means of a biasing wire (not shown, but shown as the biasing wire 410 in the second brake apparatus depicted in FIG. 2). The two caliper arm ends have fitted thereon brake pads 809, 810. The use of such pads is known in the art and it is preferred that the pads be able to be replaced when worn. The caliper arms 805, 807 surround a main wheel of the wheelchair and are positioned so that the pads 809, 810 urge against the rim of the wheel in order to clamp and prevent rotation of the wheel when the caliper arms are caused to overcome the biasing force of the biasing wire urging them apart allowing the caliper arms to pivot towards the rim. Cable means 812 attached the caliper brake 801 to the actuating assembly such as that shown in FIG. 14.

FIG. 16 is an end view seen from the left of FIG. 15 and illustrates how shaft 777 is used to secure the first and second frame clamp members together. A quick release assembly is shown in the down and locked position wherein cam 787 has been rotated such that the cam lobe bears against the collar 785, thereby securing the first and second frame clamp members together. In addition, this figure illustrates the rotating caliper mount 797 secured in caliper mount receiving bore 802.

Referring now to FIG. 17, there is shown an alternative embodiment of a caliper brake mounting assembly. The caliper mounting assembly shown in FIG. 17 incorporates the quick release embodiment utilized in FIG. 11. The mounting assembly 814 has a first frame clamp member 816 and a second frame clamp member 818. Second frame clamp member 818 has a caliper mount receiving bore 820 into which rotating caliper mount 822 is inserted. A quick release assembly 824 draws together the first frame clamp member 816 and the second frame clamp member 818 by moving the first frame clamp member 816 closer to the second frame clamp member 818. The quick release assembly includes a shaft 826 which is connected at a first end 828 to the second frame clamp member by a pivoting means 830. The pivoting means 830 are mounted on the second frame clamp member 818 and allow the shaft 826 to pivot about an axis of rotation which is substantially perpendicular to the long axis of the shaft 826. The second end 832 of the shaft 826 has a cam 834 mounted thereon. The cam 834 has a cam lobe 836 and is attached to the second end 832 of the shaft 826 by a cam mounting pin 838. The quick release lever 840 is attached to the cam 834. A quick release lever rotates the cam 834 about the axis of the cam mounting pin 838. The cam 834 is rotated such that the cam lobe 836 bears against the first frame clamp member thereby causing the first frame clamp member 816 to move towards the second frame clamp member 818, thereby drawing the first and second frame clamp members together to securely hold the wheelchair frame. When in this locked position, the shaft 826 is positioned in a cavity 842 formed in the first and second frame clamp members and coaxially aligns such that the shaft 826 may be positioned in the cavity 842 and draw together the first and second frame clamp members. To open the mounting assembly 824, the quick release lever 840 is rotated about the cam mounting pin 838 such that the cam lobe 836 no longer bears against the first frame clamp member. The shaft 826 is then pivoted about its long axis via the pivoting means until the shaft is outside of the cavity 842 and the first frame clamp member 816. The first frame clamp member 816 is then free to rotate about the frame clamp pivot 844. In preferred embodiments frame clamp pivot 844 and pivoting means 830 utilize a spring pin. A rotating caliper mount 822 is attached to the second frame clamp member 818. Rotating caliper mount 822 has a plurality of bores 846 that allow flexibility in the positioning of a caliper brake such as that illustrated in FIG. 15. The rotating caliper mount allows the user to rotate the brake away from the wheel when it is necessary to remove the wheel or for various other purposes. The rotating caliper mount 822 is secured to the second frame clamp member 818 by a caliper pin. A helical tension spring (not shown) is positioned in the second frame clamp member so as to continually exert a force against a first end of the rotating caliper mount 852 thereby engaging caliper mounting pin 848 in caliper pin seat 854.

FIG. 18 is an end view taken from the left of FIG. 17 and shows cam 834 in the down and locked position wherein shaft 826 secures the first and second frame clamp members against the frame of a wheelchair. Pivoting means 830 are shown. In certain embodiments of the present invention, it is desirable to use a spring pin to secure the first end of shaft 826 to the second frame clamp member. Rotating caliper mount 822 is shown with the caliper mounting pin 848 engaged in a caliper mounting pin seat 854.

Figure 19:
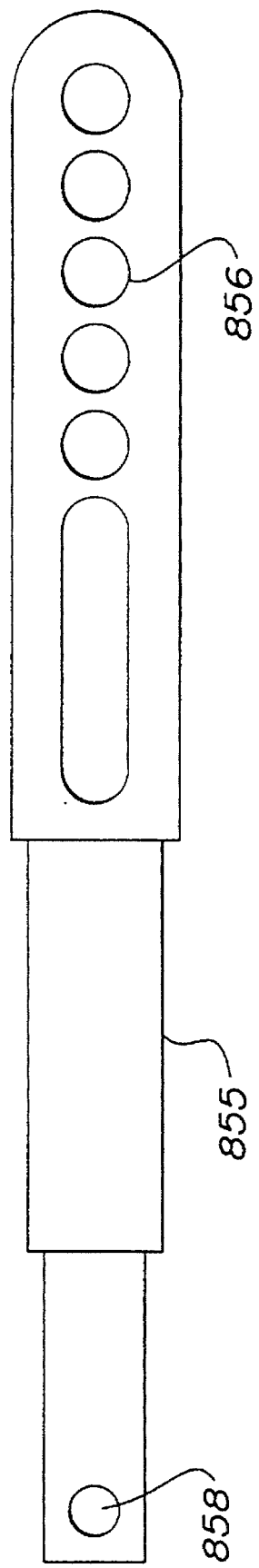
FIG. 19 is a view of the rotating caliper mount of the present invention.

Referring now to FIG. 19, a preferred embodiment of a rotating caliper mount 855 is illustrated showing bores 856 used to mount a caliper brake and a caliper mounting pin receiving bore 858.

Although various embodiments have been illustrated, this was for the purpose of describing, but not limiting the invention. In addition, it should be understood that embodiments suitable for attachment to the left hand side or the right hand side of a wheelchair have been illustrated and that for the given apparatus illustrated, a corresponding apparatus suitable for attachment to the opposite side of a wheelchair would, in most instances, constitute a mirror image of the illustrated apparatus.

This invention provides wheelchair braking apparatus which may be easily mounted or removed from a wheelchair frame without tools by virtue of a quick release assembly which allows the user to quickly mount and demount the wheelchair brake from a wheelchair. Various modifications, which will become apparent to one skilled in the art, are within the scope of the invention described in the attached claims.

I claim:

1. A brake apparatus for use on a wheelchair having a pair of rotatable wheels, and first and second frame rails adjacent said wheels, each rail having a longitudinal axis, mounting assemblies respectively associated with said first and second frame rails, each said mounting assembly comprising first and second clamp sections for securing said mounting assembly to the associated one of said frame rails, said clamp sections being pivotally attached to each other for pivotal displacement about an axis parallel to said longitudinal axis;

a quick release assembly operable in a clamping position for compressing said first and second clamp sections around said frame rail and operable in a release position for allowing pivotal displacement of said clamping sections away from said frame rail, said quick release assembly having a pivot shaft mounted on one clamp section and having a cam mounted on said shaft to bear on the other clamp section operable in the clamping position to move said clamp sections together to said compressed position, and pivoting means mounted on said shaft to pivot said cam on said shaft, said cam having a cam lobe operable to compress said sections around said frame rail in the clamping position, and to release said compression of said sections from around said frame rail in the release position; and frictional braking means mounted on said rails by said mounting assemblies with actuating means and brake pads for selectively engaging and slowing rotation of one of said rotatable wheels.

2. The apparatus of claim 1 wherein said clamp sections comprise first and second clamp members defining a cavity therebetween for receiving said frame member.

3. The apparatus of claim 1 wherein said quick release assembly comprises a hand-operated lever.

4. The apparatus of claim 1 wherein said frictional braking means comprise a cable-operated caliper brake.

5. An apparatus as claimed in claim 1 wherein said actuating means comprises brake biasing means for urging said braking means to an open, non-locked position.

6. An apparatus as claimed in claim 5 wherein said brake actuating means comprises:

a lever plate mounted on said mounting assembly;

a lever arm having first and second ends pivotally mounted to said lever plate; and cable means attached between said lever arm and said frictional braking means;

said cable means activating said frictional braking means upon a rotation of said lever arm.

7. A brake apparatus for use on a wheelchair having at least one primary wheel with a rigid wheel rim, a resilient tire, and an axis of rotation, rotation of said primary wheel in opposite directions moving the wheelchair in a forward and a rearward direction, and an elongated frame siderail adjacent to said wheel and having a longitudinal axis, said apparatus comprising:

a mounting assembly connected to said siderail, said mounting assembly comprising first and second frame clamp members, said frame clamp members being pivotally attached to each other for pivotal displacement about an axis parallel to said longitudinal axis and drawn together to secure said mounting assembly to said siderail;

a quick release assembly having a shaft pivotally mounted on the second frame clamp member with a cam having a clamping position which bears on said first frame clamp member thereby moving said first frame clamp member toward said second frame clamp member and a release position which allows pivotal displacement of said clamp members away from said siderail;

said shaft having a pivotal axis;

said cam having a cam lobe engaging said first frame clamp member upon pivotal displacement of said cam on said pivotal axis to said clamping position;

a caliper brake surrounding and engagable with said wheel rim;

connecting means connecting said mounting assembly to said caliper brake; and brake actuating means connected to said mounting assembly and to said caliper brake for actuating said brake and causing said brake to engage said wheel rim, thereby prohibiting said wheel from rotating about said axis of rotation.

8. The apparatus of claim 7 further comprising a quick release lever attached to said cam and operable to pivot said cam about said pivotal axis to bring said cam lobe to bear against said first frame clamp member in the clamping position of said assembly.

9. The apparatus of claim 7 wherein said connecting means comprise a brake bracket.

10. The apparatus of claim 9 further comprising a bracket hinge on said brake bracket to allow said bracket to rotate about an axis substantially parallel to the axis of rotation of said wheel.

11. An apparatus as claimed in claim 7 wherein said brake actuating means is comprised of:

cable means having two opposite ends connected to said caliper brake at a first end thereof; and lever means connected to said mounting assembly and to the second end of said cable means opposite said first end for pulling said cable means and actuating said caliper brake connected thereto.

12. An apparatus as claimed in claim 11 wherein said lever means is comprised of:

a lever plate mounted on said mounting assembly, a pivot on said lever plate providing a pivot axis approximately parallel to said axis of rotation; and a lever arm having first and second ends pivotally mounted at said pivot on said lever plate, said lever arm being connected at said first end to said second end of said cable means and the second end of said lever arm being movable about said pivot axis downwardly forward with respect to the forward direction of motion of said wheelchair.

13. An apparatus as claimed in claim 12, further comprising brake locking means engagable with said actuating means for locking said actuating means in locking position when the caliper brake engages said wheel.

14. An apparatus as claimed in claim 13, wherein said brake locking means is comprised of:

a second pivot having a pivot axis parallel to said first pivot axis located on said lever plate adjacent to said lever arm;

a locking lever pivotally mounted on said pivot on said lever plate, said locking lever having first and second ends on opposite sides of said pivot location;

a projection at said first end of said locking lever adjacent to said first end of said lever arm;

biasing means connected to said locking lever for urging said projection of said locking lever to rotate about said pivot on said lever plate towards said second end of said lever arm, whereby said projection is constantly urged toward said lever arm and is movable to a locking position beneath said first end of said lever arm when a force is applied to said second end of said lever arm to actuate said caliper brake and the first end of said lever arm is rotated away from said projection; and said locking lever being movable about said pivot from said locking position, said projection moving from beneath said first end of said lever arm with the application of a downwardly forward force to the second end thereof.

15. A brake apparatus for use on a wheelchair having at least one primary wheel with a rigid wheel rim and a resilient tire, and an axis of rotation, rotation of said primary wheel in opposite directions moving the wheelchair in a forward and a rearward direction, a caliper brake surrounding said tire and engageable with said rigid wheel rim, and first and second frame rails, said apparatus comprising:

a first mounting assembly connected to said first rail, said first mounting assembly comprising first and second frame clamp members, said frame clamp members drawn together to secure said mounting assembly to said first rail;

a first release assembly which bears on said first frame clamp member thereby moving said first frame clamp member toward said second frame clamp member;

brake actuating means connected to said first mounting assembly and a brake cable having cable ends connecting said brake actuating means to said caliper brake;

brake locking means engagable with said brake actuating means for locking said actuating means in locking position when the caliper brake engages said wheel, comprising a lever plate mounted on said mounting assembly, a first pivot on said lever plate providing a first pivot axis;

a lever arm having first and second ends pivotally mounted at said on said lever plate, said lever arm being connected at said first end to one of cable ends and the second end of said lever arm being movable about said first pivot axis downwardly forward with respect to the forward direction of motion of said wheelchair;

a second pivot having a second pivot axis parallel to said first pivot axis located on said lever plate adjacent to said lever arm;

a locking lever pivotally mounted on said second pivot on said lever plate, said locking lever having first and second ends on opposite sides of said pivot location;

a projection at said first end of said locking lever adjacent to said first end of said lever arm;

biasing means connected to said locking lever for urging said locking lever to rotate about said second pivot axis on said lever plate towards said second end of said lever arm, whereby said projection is constantly urged toward said lever arm and is movable to a position beneath said first end of said lever arm when a force is applied to said second end of said lever arm to actuate said caliper brake and the first end of said lever arm is rotated away from said projection and said locking lever being movable about said second pivot axis from a position where said projection moves from beneath said first end of said lever arm with the application of a downwardly forward force to the second end thereof;

a second mounting assembly connected to said second rail, said second mounting assembly comprising first and second frame clamp members, said frame clamp members drawn together to secure said mounting assembly to said second rail;

a second release assembly which bears on said first frame clamp member of said second mounting assembly thereby moving said first frame clamp member toward said second frame clamp member, said second mounting assembly connected to said caliper brake.

16. The apparatus of claim 15 wherein said first and second release assemblies comprise a shaft having first and second ends, said shaft attached at its first end to said second frame clamp member, said second end of said shaft having a cam mounted thereon.

17. The apparatus of claim 16 wherein said shaft is attached to said second frame clamp member by pivoting means mounted on said second frame clamp member to allow said shaft to pivot about an axis of rotation substantially perpendicular to the long axis of said shaft, said shaft having at said second end a bore disposed substantially perpendicularly to the long axis of said shaft and further comprising;

a cam mounting pin extending through said bore;

a cam having a cam lobe;

said cam mounting pin attaching said cam to said second end of said shaft.

18. The apparatus of claim 17 further comprising a quick release lever, said quick release lever attached to said cam, said quick release lever capable of rotating said cam about said cam mounting pin to bring said cam lobe to bear against said first frame clamp member.

19. The apparatus of claim 15 wherein each of said first frame clamp members is mounted to its connected frame rail to allow said first frame clamp member to rotate about an axis parallel to the axis of its connected frame rail.

20. The apparatus of claim 15 wherein said second mounting assembly is attached to a caliper mount connecting said caliper brake to said second mounting assembly.

21. The apparatus of claim 20 wherein said caliper mount comprises a rotating caliper mount having a long axis and which is capable of rotation about said long axis.

22. An apparatus as claimed in claim 1 further comprising brake locking means engagable with said actuating means for locking said actuating means when the caliper brake engages said wheel.

23. An apparatus as claimed in claim 15 wherein said brake cable has two opposite ends and is connected to said caliper brake at a first end thereof and to the lever arm at the end of said cable means opposite said first end for actuating said caliper brake.

24. An apparatus as claimed in claim 23, said lever plate pivot axis being approximately parallel to said axis of rotation.

25. An apparatus as claimed in claim 24 wherein said brake cable is comprised of:

a cable wire connected to said caliper brake and said lever means;

an outer sheath surrounding and spaced from said cable wire, said outer sheath having a first end and a second end;

sheath connected means surrounding said first end of said sheath and connecting said first end of said sheath to said lever plate; and said sheath connecting means being movable with respect to said lever plate to urge said sheath towards said caliper brake.

26. A brake apparatus for use on a wheelchair having at least one primary wheel with a rigid wheel rim and a resilient tire, and an axis of rotation, rotation of said primary wheel in opposite directions moving the wheelchair in a forward and a rearward direction, and first and second frame rails, said apparatus comprising:

a caliper brake comprising a pair of caliper arms having free ends straddling said tire, and brake pads on the free ends positioned to engage the rigid wheel rim, said caliper brake operable to displace the calipers between open and closed positions to apply incremental braking as the calipers are displaced from open position to closed position;

a first mounting assembly having frame clamp means secured to said first rail;

brake actuating means connected to said first mounting assembly;

a second mounting assembly having frame clamp members secured to said second rail, said second mounting assembly connected to said caliper brake;

a brake cable connecting said brake actuating means to said caliper brake; and brake locking means engagable with said actuating means for locking said actuating means in locking position when the caliper brake is in said closed position wherein said brake locking means is comprised of:

a lever plate mounted on said first mounting assembly;

a first pivot on said lever plate providing a first pivot axis;

a lever arm having first and second ends pivotally mounted at said pivot on said lever plate, said lever arm being connected at said first end of said second end of said cable means and the second end of said lever arm being movable about said first pivot axis downwardly forward with respect to the forward direction of motion of said wheelchair;

a second pivot having a second pivot axis parallel to said first pivot axis located on said lever plate adjacent to said lever arm;

a locking lever pivotally mounted on said second pivot on said lever plate, said locking lever having first and second ends on opposite sides of said pivot location;

a projection at said first end of said locking lever adjacent to said first end of said lever arm;

biasing means connected to said locking lever for urging said locking lever to rotate about said second pivot axis on said lever plate towards said second end of said lever arm, whereby said projection is constantly urged toward said lever arm and is movable to a position beneath said first end of said lever arm when a force is applied to said second end of said lever arm to actuate said caliper brake and the first end of said lever arm is rotated away from said projection and said locking lever being movable about said second pivot axis from a position where said projection moves from beneath said first end of said lever arm with the application of a downwardly forward force to the second end thereof.

27. A brake apparatus according to claim 1 for use on a wheelchair in which the wheels comprise a rigid rim with a resilient ground-engaging tire, said brake pads positioned to engage the rigid rim of said one wheel.

28. A brake apparatus according to claim 27 wherein said braking means comprises a pair of caliper arms having fee ends straddling said tire, and releasable fasteners securing said brake pads to said free ends.

* * * * *

UNITED STATES PATENT AND TRADEMARK OFFICE
CERTIFICATE OF CORRECTION

PATENT NO. : 5,492,355
DATED : February 20, 1996
INVENTOR(S) : Theodore M. Berry It is certified that error appears in the above-indentified patent and that said Letters Patent is hereby corrected as shown below:

Column 6, line 44, before "extension" insert --is an--;

Column 10, line 14, "that" should be --than--;

Column 22, line 62, "fee" should be --free--.

Signed and Sealed this

Eighteenth Day of June, 1996

*Attest:*

BRUCE LEHMAN

*Attesting Officer*        *Commissioner of Patents and Trademarks*